(12) United States Patent  (10) Patent No.: US 7,960,492 B2
Mannle et al.  (45) Date of Patent: *Jun. 14, 2011

(54) POLYBRANCHED, ORGANIC/INORGANIC HYBRID POLYMER AND METHOD FOR ITS MANUFACTURE

(75) Inventors: Ferdinand Mannle, Oslo (NO); Christian Simon, Oslo (NO); Jest Beylich, Oslo (NO); Keith Redford, Hagan (NO)

(73) Assignee: Sinvent As, Trondheim (NO)

( * ) Notice: Subject to any disclaimer, the term of this patent is extended or adjusted under 35 U.S.C. 154(b) by 919 days.

This patent is subject to a terminal disclaimer.

(21) Appl. No.: 11/578,471

(22) PCT Filed: Apr. 15, 2005

(86) PCT No.: PCT/NO2005/000125
§ 371 (c)(1),
(2), (4) Date: Jul. 24, 2007

(87) PCT Pub. No.: WO2005/100449
PCT Pub. Date: Oct. 27, 2005

(65) Prior Publication Data
US 2008/0039607 A1  Feb. 14, 2008

(30) Foreign Application Priority Data
Apr. 15, 2004 (NO) .................... 20041544

(51) Int. Cl.
*C08G 77/26* (2006.01)
(52) U.S. Cl. .......................... 528/38; 528/25
(58) Field of Classification Search ............ 528/38, 528/25
See application file for complete search history.

(56) References Cited

U.S. PATENT DOCUMENTS

| 5,010,202 A | * | 4/1991 | Greco | .................. 548/110 |
| 6,248,682 B1 | | 6/2001 | Thompson et al. | |
| 6,479,057 B2 | | 11/2002 | Allwohn et al. | |

FOREIGN PATENT DOCUMENTS
EP  0 393 778  10/1990
JP  8-73594  3/1996

OTHER PUBLICATIONS

English Abstract of JP 8-73594 dated Mar. 19, 1996.

* cited by examiner

*Primary Examiner* — Kuo-Liang Peng
(74) *Attorney, Agent, or Firm* — Ladas & Parry LLP

(57) ABSTRACT

Polybranched, particulate, organic/inorganic hybrid polymer in the form of a sol-gel product having the basic structure: Formula (I) where X is a linkage group chosen among $C_1$-$C_{18}$-alkylene and arylene, $R_1$-$R_6$ are chosen among hydrogen, $C_1$-$C_{18}$-alkyl, aryl, formyl, aliphatic or aromatic carbonyl, carbamoyl, sulphonyl, sulphoxyl, phosfonyl, sulphinyl or phosphinyl, or $R_1$-$R_6$ are chosen among condensation products and addition products of acids, alcohols, phenoles, amines, aldehydes or epoxides.

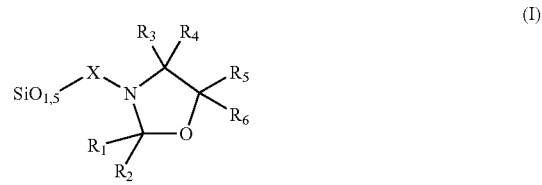

(I)

5 Claims, No Drawings

POLYBRANCHED, ORGANIC/INORGANIC HYBRID POLYMER AND METHOD FOR ITS MANUFACTURE

The present invention concerns a polybranched, organic/inorganic hybrid polymer as defined by the preamble of claim 1 and a method for its manufacture.

BACKGROUND

Polymer materials are utilized in an increasing number of categories of products, such as components for cars, boats, airplanes, within the electronics industry and other advanced industry as well as in paints and other coatings, for special packaging etc. The uses of polymer materials in new categories of products are only limited by the product properties. It is thus a continuous need for development of polymer products with improved properties e.g. with respect to increased scratch resistance, improved weather resistance, increased UV resistance, increased chemical resistance and improved properties with respect to antioxidation, anticorrosion etc.

In addition to pure polymer materials there has also been developed products based on materials that may be described as hybrids between inorganic and organic materials, which means that these materials are macro molecules that may have an inorganic core and organic branches.

Organic polymer molecules with branched structures have an enormous economical growth potential, particularly as components in new materials. So-called dendrimers are important examples of such polymer molecules with a perfectly branched structure as well as hyperbranched polymers with statistically progressive branching. Both dendrimers and hyperbranched polymers are denoted dendritic polymers. Dendritic (from Greec: "dendron"=tree) characterizes the principle of a progressive branching that is more or less perfect (G. R. Newkome, C. N. Moorefield, F. Vögtle, "Dendrimers and Dendrons: Concepts, Syntheses, Applications", Wiley -VCH, Weinheim, (2001)). Formula 1 illustrates the principle difference between linear polymers and dendritic polymers (hyperbranched polymers and dendrimers).

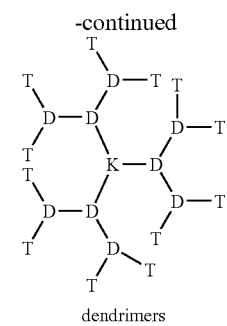

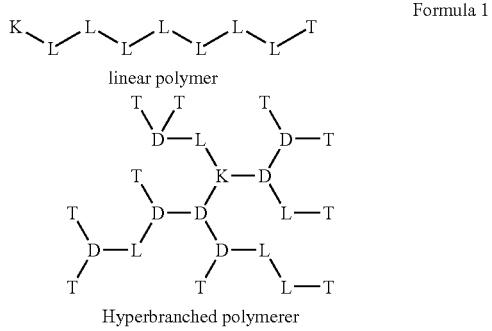

Formula 1 linear polymer

Hyperbranched polymerer dendrimers

K = germ ( the beginning of the polymer molecule)
L = linear propagation
D = dendritic branching
T = termination (the end of the polymer molecule)

Dendritic polymers are particularly interesting because the T units may carry functional groups and the density of available functional groups per weight or volume unit of the polymer is much higher than what is the case for linear polymers. Functional T groups may be used to impart a function in a material, like an antioxidant, a UV absorber, or a radical scavenger as described in WO publication No. 02092668. Alternatively the T groups may be used as very efficient cross-linkers of organic materials like epoxy resins or polyurethanes or as cross-linkers for thermoplastics. Due to the high degree of cross-linking between dendritic polymers and such organic compounds the dendritic polymers are superior cross-linkers compared to conventional cross-linkers like polyamines, polyalcohols, or multifunctional acrylates. Higher degree of cross-linking of an organic material like a cross-linked thermoplastic improves properties such as chemical resistance, weather resistance and wears resistance and makes the material useful for applications at higher temperature. (Hans Zweifel (ed.), Plastics Additives Handbook, Carl Hanser Verlag, München, (2001), 725-811). The T groups may also be used to organize the dendritic polymers in a network. As component in a material the dendritic polymer thus may induce improved barrier properties. Alternatively such dendritic polymers may be used as a binder or as a component in a thermoset plastic.

Dendrimers are usually manufactured in relatively complicated and expensive synthesis comprising several steps. The process conditions must be maintained very accurately in order to achieve a perfect progressive branch structure. Their industrial applications are therefore limited.

A general method of manufacture of hyper branched polymers was early described by Flory (P. J. Flory, Principles of Polymer Chemistry, Cornell University, (1953)). The polymerization of an $AB_2$ monomer where A may react with B but where the reactions between A and A and between B and B are precluded, leads to a hyperbranched polymer.

Another way of manufacturing hyperbranched polymers involves the utilization of a reactive monomer that also carries an initiator, a so-called "inimer". One example is the base catalyzed reaction between the inimer glycidol and the germ trimethylol propane as illustrated by Formula 2.

Formula 2

-continued

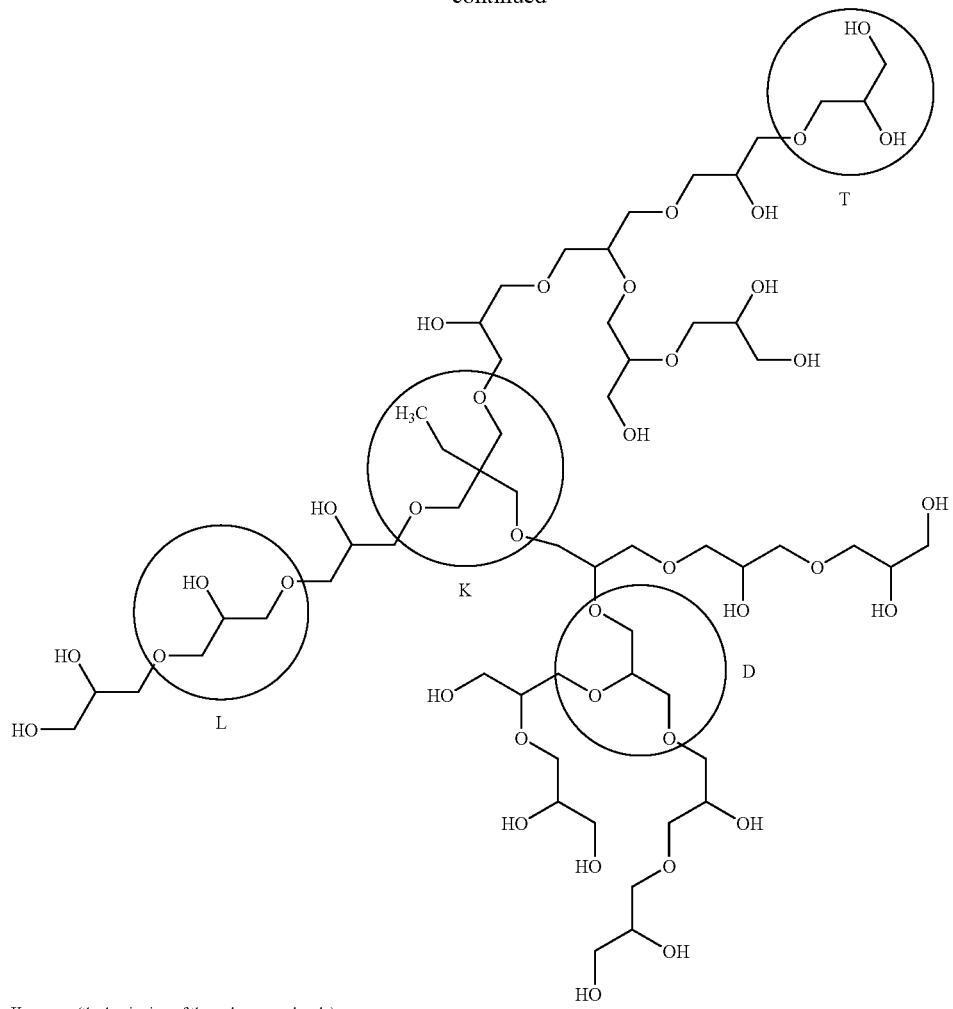

K = germ (the beginning of the polymer molecule)
L = linear propagation
D = dendritic branching
T = termination (the end of the polymer molecule)

Hyperbranched polymers made in this way have properties that are quite similar to corresponding dendrimers (A. Sunder, R. Hanselmann, H. Frey, R. Muhlhaupt; *Macromolecules*, (1998), 32, 4240). This implies a much lower viscosity than that of linear polymers with a comparable number of free available HO-groups. A characteristic feature in the manufacturing process is that the inimer glycidol must be added very slowly to the germ and in a very thin dilution. Thus, the cost-efficiency of the process is severely reduced which is why the utility of hyperbranched polymers in industrial applications is quite limited.

It is previously known to perform certain modifications of the T groups of hyperbranched polymers. J.-P. Majoral, A.-M. Caminade and R. Kraemer, *Anales de Quimica Int. Ed.*, (1997), 93, 415-421 describe the functionalization of dendrimers containing phosphorus. The functionalization of the T groups can be made with identical/similar chemical groups or with different chemical groups FR 2761691 discusses dendrimers with functional groups at the surface that are modified through a reaction with cyclic thioesters. The reaction leads to a dendrimer surface with thiol groups that are attached to the dendrimer by amide or amine bondings. The products may be used as antioxidants. The dendrimers described are of the type polyamidoamine dendrimers (PAMAM dendrimers). PAMAM dendrimers contain tertiary amines that comparatively easy may be degraded after conversion to quaternary ammonium salts or aminoxides (A. W. Hofmann, *Justus Liebigs Ann. Chem.* (1851), 78, 253-286; A. C. Cope, E. R. Trumbull, *Org. React.* (1960), 11, 317-493; A. C. Cope, T. T. Foster, p. H. Towle, *J. Am. Chem. Soc.* (1949), 71, 3929-3935). Quaternary ammonium salts or aminoxides from amine based dendrimers can be formed when additives of amine based dendrimers are incorporated/compounded into thermoplastics with subsequent processing of the thermoplastics (e.g. film blowing, extrusion, casting). Such a degradation on one hand leads to a partial deterioration of the dendrimer core and on the other hand to formation of degradation products which may leak out and thereby reduce the surface quality of the polymer product. In addition tertiary amines may during processing of the thermoplastic form free radicals by decomposition of hydro peroxides (A. V. Tobolsky, R. B. Mesrobian, *Organic Peroxides*, (1954), Interscience Publishers, New York, p. 104-106). Dendrimers and hyperbranched polymers that contain tertiary amines thereby may induce an unintended degradation of thermoplastics during their processing, storage or use.

WO 01/48057 discusses multifunctional stabilizers against thermal oxidative degradation based on a core structure containing tertiary amines. As mentioned above this may lead to an unintended degradation of the core structure during processing, storage or use of (the) thermoplastics. The molar weight of a typical stabilizer manufactured in accordance with WO 01/48057 is 1246 g/mole WO 97/19987 discusses combinations of polymer additives and modified dendrimers that may be used in polymer materials. In the exemplification of WO 97/199987 the dendrimers are based on polypropyleneimine (PPI) of $3^{rd}$, $4^{th}$ and $5^{th}$ generation thereby including 16, 32, and 64 terminal amine groups. The core structure contains tertiary amines which may lead to an unintended degradation of the core structure during processing, storage or use of thermoplastics. The modification of the PPI dendrimer with a fatty acid to form a multifunctional fatty acid amide may bee conducted by means of heating in a suitable solvent. The tertiary amine groups in the core structure of the dendrimer and primary amine groups at the dendrimer surface may in presence of oxygen contribute to partial degradation of the dendrimer structure. As explained above free radicals may be formed by decomposition of hydro peroxides. Such a partial degradation is indicated by a faint brown or yellow colour of the modified PPI dendrimer, like in examples I, XI, and XII in WO 97/19987. Typical molecule weights for modified PPI dendrimers in WO 97/19987 are in the range 10 000 to 40 000 g/mole. In WO 02/092668 surface activated hyperbranched or dendritic stabilizers comprising at least one additive group and a hyperbranched or dendritic core is discussed. In the exemplification of WO 02/092668 only dendritic cores based on 2,2-bis-(hydroxymethyl)-propionic acid is used. The dendritic core and the bonding to the additive group thereby are mainly based on ester bondings, which make the stabilizer sensitive to hydrolysis. In addition the exemplification of WO 02/092668 shows that the molecules of the prepared stabilizers as determined by gel permeation chromatography is between 1000 and 1500 grams/mole.

One type of particulate polymers with properties corresponding to the properties of hyperbranched polymers comprises an inorganic $Si_xO_{(1.5)x}$-core with one T group per Si atom and is known as POSS (polyhedral oligosilesquioxanes). The most common compound of this class is a POSS with x=8 and substantially cubic structure (C. Sanchez, G. J. de A. A. Soler-Illia, F. Ribot, T. Lalot, C. R. Mayer, V. Cabuil; *Chem. Mater.*, (2001), 13, 3066). The manufacture of POSS is expensive (M. C. Gravel, C. Zhang, M. Dinderman, R. M. Laine; *Appl. Organometal. Chem.*, (1999), 13, 329-336 and WO 01/10871) and their industrial applicability is therefore limited.

Another type of particulate polymers with properties corresponding to the properties of hyperbranched polymers consists of an inorganic $Si_xO_{(1.5)x}$ core that carries one T group per Si atom and may be manufactured in a sol-gel process through controlled hydrolysis and condensation of a silane with a structure

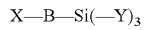

where Y is chosen among hydrolysable residues and X—B basically corresponds to the T group. The process is described e.g. in Applicant's own WO publication No. 0208343. Sol-gel processes may be cost efficient so that they may be conducted in industrial scale from favourable raw materials and under mild conditions, i.e. without use of high pressures or high temperatures and without particular precautions like extreme dilution or the like. Thus particulate polymers with properties corresponding to properties of hyperbranched polymers manufactured by sol gel processes are industrially applicable in many areas.

Many examples of utilization of sol gel products in polymer products are known (DE 199 33 098, EP 666 290). Normally the main focus is placed upon the inorganic $Si_xO_{(1.5)x}$ core with a size in the nanometer range and thereby upon the sol-gel product as inorganic nano particle, cf. DE 199 33 098 and EP 486 469. The inorganic residues X—B are typically used to anchor the sol gel products in an organic matrix, cf. EP 486 469

The sol gel process involving hydrolysis and condensation of a silane in which the X—B group contains one or more amide groups is particularly simple because no external catalyst is needed and because the process may be conducted at ambient temperature or under moderate heating. One example is controlled hydrolysis and condensation of γ-aminopropyl trialkoxysilane as described in applicant's own patent application, WO publication No. 0208343. Controlled hydrolysis and condensation of silanes in which the X—B groups contains one or more amide groups typically leads to a sol in which the resulting particulate polymer product has an organic/inorganic structure (hybrid polymer) that is comparable with a hyperbranched polymer product with a number of more or less free amine groups in the T groups. Such organic/inorganic hybrid polymers exhibits a large number of functional T groups compared to their weight and/or volume. At the same time its compact structure compared to the structure of linear polymers ensures desirable properties like low viscosity and good admixing properties with thermoset plastics and thermoplastics. An example of an organic/inorganic hybrid polymer with properties corresponding to a hyperbranched polymer is shown by Formula 3.

Formula 3

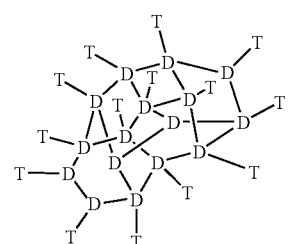

D = dendritic branching based on $SiO_{1.5}$
T = termination (functional T-groups)
D-groups that are bonded to fewer than three D units do not carry hydrolysed and/or condensed substituents Organic/inorganic hybrid polymers with properties corresponding to properties of hyperbranched polymers find utilization e.g. as additives for polymer products like thermoset plastics and in lacquers and other types of coatings for surface protection. Used in appropriate amounts and with convenient particle size such hybrid polymers may contribute to a significant improvement of the properties of the plastic material or the lacquer in question, hereunder an increased wear resistance/scratch resistance and/or weather resistance.

Prior art technology in the area sol gel processes/products may broadly be divided in four main categories as elaborated in more detail below, with reference to some examples or publications.

A first category concerns modification of non-hydrolysed amine containing silanes (DE 2023968, WO 03/029361, EP 0253770, EP 666290), commonly with bi-functional epoxy compounds (like e.g. JP 2001192485 ), and use of same in thermoplastics or in coatings. Hydrolysis and condensation are in some cases subsequently conducted but prior to its addition to the thermoplastics or coating in question. In general this method leads to an undefined distribution of molecular sizes with many large molecules. This implies that a subsequent hydrolysis is difficult to conduct with great success, since water will not reach all sites of the very large molecules. A low degree of hydrolysis implies a lower scratch resistance and a lower weather resistance for the product. A further disadvantage is that the water used for the hydrolysis in presence of the organic parts of the molecule may react in an undesired manner with active groups of said organic parts. Utilization of non-hydrolysed alkoxysilane compounds in a thermoplastic or thermoset plastic material implies that alcohols like ethanol and methanol are formed during the subsequent, slow hydrolysis of the silane compound, i.e. subsequent to the plastic material having been exposed to water. This may lead to reduced mechanical properties of the thermoplastic or the coating. In addition the formation of alcohols such as ethanol and/or methanol may cause migration of additives and/or degradation products to the surface of a thermoplastic or a coating, which may reduce the surface quality severely.

Another category of prior art methods concerns modification of nitrogen containing sol gel products by chemical reactions in which amine groups are not directly involved (S. kar, P. Joly, M. Granier, O. Melnyk, J.-O. Durand, *Eur. J. Org Chem*.; (2003), 4132-4139) or are not important (U.S. Pat. No. 5,744,243). The latter publication describes a coating composition that is achieved by mixing a) an acid catalysed hydrolysis and condensation of silane and monomer and b) a polymerized solution of organic polymer that contains functions which are compatible with the silane monomer. The coating is used for light reflection.

Objects

It is an object of the present invention to provide components or additives that are suitable for a number of applications within organic chemistry and in particular within polymer chemistry.

It is a further object to provide methods for the manufacture of components, materials, additives and/or chemical compositions (mixtures) and to adapt one or more of the properties of these, such as, but not limited to, their weather resistance, scratch resistance, viscosity, in dependence of the application in question.

It is hereunder an object to provide a stabilizer for thermoplastics with a broader range of utility than that known, monofunctional stabilizers exhibit.

The Invention

According to a first aspect the present invention concerns a polybranched, particulate, organic/inorganic hybrid polymer as defined by claim 1.

According to another aspect the invention concerns a method for the manufacture of a polybranched, particulate, organic/inorganic hybrid polymer, as defined by claim 2.

According to a third aspect the invention concerns uses of the polybranched, organic/inorganic hybrid polymer, as defined by the claims 3-5.

The polybranched, organic/inorganic hybrid polymer according to the invention is due to its inherent structure suitable for a number of objects as stated above. In the structure the element $SiO_{1.5}$ represents the ideal ratio between silicon and hydrogen subsequent to a complete hydrolysis and condensation of the silane. It is appreciated that the boding to the linkage group X is from the silicon atom.

The manufacture constituting the second aspect of the invention involves a sol-gel process in which the T groups are chemically modified in one or more additional steps immediately after the hydrolysis and condensation are completed, utilizing the same reactor equipment as for the hydrolysis and condensation of the silane. Such batch processing is the basis for a very cost-efficient manufacture of particulate organic/inorganic polybranched polymers which may comprise a high number of different T groups and which may therefore be used in a high number of different industrial applications.

With controlled hydrolysis and condensation herein is to be understood hydrolysis and condensation of a suitable silane compound as describes in Applicant's publication WO 0208343 with the difference that the reaction mixture includes a suitable stabilizer that prevents oxidative degradation of reactants and reaction product during hydrolysis and condensation as well as during subsequent modification.

The first step is hydrolysis of a suitable silane compound, $R'$—$Si(OR)_n$, wherein the group $R'$ does not participate in the hydrolysis or condensation reactions. Alkoxide ligands are replaced by hydroxyl groups:

A controlled amount of water and a controlled amount of a glycol based solvent is added during this step. The reaction temperature and the reaction time are also controlled.

The second step is condensation in which the hydroxyl group can react with hydroxyl groups or alkoxy groups from other silicon centres and form Si—O—Si bonds and water or alcohol respectively:

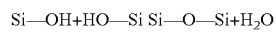

or

To manufacture particles of a certain size it is required to establish chemical conditions that ensures a correct balance between the kinetics of the two reactions, namely condensation and hydrolysis. While the condensation contributes to formation of polymer chains from (single) monomer molecules, the hydrolysis contributes to a polycrystallinic precipitation or oxohydroxide precipitation. The combination of amino-functional silanes and exchange of alkoxide groups with strong ligands will moderate the hydrolysis reaction, which will ensure that the polymer chains not become too long but remain in the size of oligomers. In practice the particles will be prepared with a size of few nanometers, more typically less than 10 nm. A suitable stabilizer is normally added to the reaction composition to avoid oxidative degradation of reactants and reaction products during hydrolysis and condensation and subsequent modification. The resulting solution is comprised of inorganic polymer particles dispersed in a solvent.

The method for preparation (manufacture) of polybranched organic/inorganic hybrid polymers according to the invention a) substitution of a N—H hydrogen atom on the —X linkage group by an epoxide, forming an amino alcohol.

b) reaction of the amino alcohol with a ketone or an aldehyde forming oxazolidine.

Examples of stable epoxides for an addition reaction are monoglycidyl compounds that may be represented by:

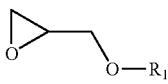

where R1 is chosen among groups like hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, in which the carbon chains of said compounds optionally may contain one or more of the elements oxygen, nitrogen, sulphur, phosphorous, silicon, and boron and where R1 is chosen from condensation products or addition products of one or more type of chemical compounds such as acids, alcohols, phenols, amines, aldehydes or epoxides.

Examples if suitable epoxides include compounds with epoxidized C=C double bonds that may be represented by

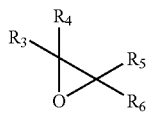

where $R_3$-$R_6$ are chosen among groups like hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, in which the carbon chains of said compounds optionally may contain one or more of the elements oxygen, nitrogen, sulphur, phosphorous, silicon, and boron or where $R_3$-$R_6$ are chosen from condensation products or addition products of one or more type of chemical compounds such as acids, alcohols, phenols, amines, aldehydes or epoxides.

Examples of suitable aldehydes and ketones may be represented by

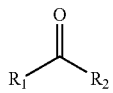

where $R_1$ and $R_2$ are chosen among groups like hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, in which the carbon chains of said compounds optionally may contain one or more of the elements oxygen, nitrogen, sulphur, phosphorous, silicon, and boron or where $R_1$ and $R_2$ are chosen from condensation products or addition products of one or more type of chemical compounds such as acids, alcohols, phenols, amines, aldehydes or epoxides The organic/inorganic hybrid polymers according to the present invention have properties that are comparable with the properties of organic, hyperbranched polymers and may be used for many applications, like functional additives in thermoplastics and thermoset plastics, e.g. as antioxidant, UW absorb or radical scavenger, as cross-binder in thermoplastics and thermoset plastics, as component in adhesives, lacquers and coating products and as functional material in other connections. Used as additive the polybranched hybrid polymers prepared according to the invention contribute to a lasting increase in scratch resistance and weather resistance for the products in which they are used.

Temperature and stability during hydrolysis of the organic/inorganic hybrid polymers according to the invention are better than those of the organic hyperbranched polymers due to stable Si—O bonds in the polymer core and due to the core's compact structure with a very high degree of cross-linking.

Reversible viscosity changes is observed during heating/cooling due to the particulate structure with a stable inorganic core and function carrying organic groups that are bonded to the inorganic core, which is important in connection with the subsequent treatment/processing of products based on the invention.

The product and the method for the manufacture according to the invention are cost efficiency in industrial utilizations, due to the prices of the raw materials and the conditions under which the manufacture may take place. The manufacture of materials and products according to the invention is based on a batch process under mild conditions (T<470 K and pressure P<0.3 MPa).

It is furthermore possible with the method according to the invention to manufacture additives for avoiding leakages of additives and/or degradation products. Correspondingly self-organizing networks and thermo-stable or thermo-reversible functional materials may be formed, such as adhesives.

EXAMPLES

Experiment 1

Manufacture of a polybranched organic/inorganic hybrid polymer by a sol-gel process followed by a two-step modification.

a) 221.4 g (1.00 mol) γ-aminopropyltriethoxysilane (A-1100, GE Silicones, USA) was placed in a 1000 ml round bottom flask with hose cooler and magnetic stirrer. A mixture of 93.6 g (0.60 moles) butyldiglykol (BDG) and 22.5 g (1.30 moles) water and 1.00 g Tinuvin 123 (Ciba Specialty Chemicals, Switzerland) was added. The mixture was heated in an oil bath at 110° C. under reflux for 45 minutes. Thereafter the volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 192 ml distillate was recovered. The reaction product was a clear, uncoloured liquid with a Gardner Color=1 (according to. Gardner Color Scale/ASTM D1544).

b) The reaction product from a) was heated to 70° C. to obtain a clear liquid. Then 130.2 g (1.00 moles) tert-butylglycidylether was added and the reaction mixture was held at 70° C. for an hour. Then a solution of 98.1 g (1.00 mole) cyclohexanone in 100 ml toluene was added. The reaction mixture was boiled under reflux in 15 minutes and the volatile reaction products and reactants were removed by vacuum distillation. A clear product with a Gardner Color=2, having the form of a viscous gel at 20° C. and a non-viscous liquid at 90° C., was obtained.

Experiment 2

In a manner corresponding to Experiment 1 a polybranched organic/inorganic hybrid polymer with functional groups of the type hindered amine was prepared from triacetoneamine (2,2,6,6-tetramethyl-4-piperidinone, CAS [826-36-8], Sigma-Aldrich Norway AS).

Experiment 3

In a manner corresponding to Experiment 1 a polybranched organic/inorganic hybrid polymer with functional groups of phenolic type was prepared from 3-hydroxybenzaldehyde, CAS [100-83-4], Sigma-Aldrich Norway AS).

Experiment 4

The products from Experiment 2 and 3 were compounded into a polypropylene homopolymer (HG430MO, Borealis AS) by means of a Clextral specially instrumented double helix extruder.

The amount of polybranched, organic/inorganic hybrid polymer was 5% in all cases. The compounded products were injection moulded by means of a Battenfeld-injection moulding apparatus to 2 mm thick sheets. The sheets were homogenous and about as transparent as injection moulded polypropylene homopolymer without any polybranched, organic/inorganic hybrid polymer.

Experiment 5

The viscosity of the product from Experiment 2 was measured in a rheometer of the type Physika MCR 300 at 20° C. og 90° C. The measurements were conducted three times for each sample and the mean value at each temperature was calculated. The result is shown in the table below. For comparison the viscosity of the POSS compound Isooctyl-POSS (cage mixture; Sigma-Aldrich Norway AS, ref.-nr. 560383) was also measured. The table also shows the viscosity values for n-butanol at the same temperatures (Handbook of Chemistry and Physics, CRC Press, 71. ed., (1990-1991)).

| Compound | Viscosity at 20° C.[mPa * s] | Viscosity at 90° C.[mPa * s] |
|---|---|---|
| Experiment 2 | 800 000 | 800 |
| POSS | 16 000 | 200 |
| n-butanol | 3 | ~0.7 |

The relative change in viscosity shown for the result of Experiment 2 (according to the invention) is of a factor 1000 while it for the comparison examples is of a factor 80 (POSS) and less than 5 (n-butanol).

Experiment 6

The manufacture of a polybranched, organic/inorganic hybrid polymer with aminoalcohol functional groups, corresponding to an intermediate product in the manufacture of a polybranched, organic/inorganic hybrid polymer according to the invention.

a) 221.4 g (1.00 mol) γ-aminopropyltriethoxysilane (A-1100, GE Silicones, USA) was placed in a 1000 ml round bottom flask with hose cooler and magnetic stirrer. A mixture of 93.6 g (0.60 moles) butyldiglykol (BDG) and 22.5 g (1.30 moles) water and 1.00 g Tinuvin 123 (Ciba Specialty Chemicals, Switzerland) was added. The mixture was heated in an oil bath at 110° C. under reflux for 45 minutes. Thereafter the volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 192 ml distillate was recovered. The reaction product was a clear, uncoloured liquid with a Gardner Color=1 (according to. Gardner Color Scale/ASTM D1544).

b) The reaction product from a) was heated to 70° C. to obtain a clear liquid. Then 256.4 g (1.00 moles) of Araldite DY-E (glycidylether of $C_{12}$-$C_{14}$-alcohol, Vantico AG (Huntsman AG), Switzerland) was added and the reaction mixture was held at 70° C. for an hour. A clear product with a Gardner Color =1, having the form of a viscous gel at 20° C. and a non-viscous liquid at 90° C., was obtained.

The distillate in a) comprised only insignificant amounts of volatile amine. In a corresponding experiment in which no stabilizer (like e.g. Tinuvin 123) was used during the manufacturing process, the distillate in a) comprised relatively large amounts of the volatile amine products, which mainly is due to degradation of A-1100 during the synthesis

Experiment 7

Comparison experiment to Experiment 6, in which the substitution with an epoxide compound was conducted prior to the hydrolysis of the silane.

| Experiment No. | Silane | Epoxide 1 | Degree of hydrolysis prior to substitution with epoxide | Gardner-Color |
|---|---|---|---|---|
| Experiment 7 | A-1100 | Araldite DY-K (164.2 g; 1.00 moles) | Not hydrolysed | 4-5 |
| Experiment 6 | A-1100 | Araldite DY-K (164.2 g; 1.00 moles) | Hydrolysed | 1 |

The product was a clear gel but had much stronger colour than the product of Experiment 6

Experiment 8

Manufacture of polybranched, organic/inorganic hybrid polymer by a sol-gel process in a 5 liter reactor.

2801 g (12.7 moles) of γ-aminopropyltriethoxysilane (DYNASYLAN® AMEO, Degussa AG, Germany) was placed in a 5 liter reactor (NORMAG Labor- und Prozesstechnik, Ilmenau, Germany) with temperature controlled heat mantle, stirring assembly, thermometer, dropping funnel, vertical cooler with column head for rapid change between reflux and distillation and vacuum connection (membrane pump). A mixture of 821 g (7.6 moles) of 2-butoxyethanol (DOWANOL EB, Dow Chemical, USA) and 296 g (16.4 moles) of water and 16 mg of the reaction product of Experiment 2. The mixture was heated under reflux for 45 minutes. Then the volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 2334 ml of distillate was recovered. The reaction product was a clear, uncoloured liquid with a Gardner Color=1 (according to. Gardner Color Scale/ASTM D1544).

Experiment 9

Development of the organic branches in a polybranched, organic/inorganic hybrid polymer as prepared in Experiment 8.
a) 558 g of the reaction product from Experiment 8 was heated to 70° C. Then 625 g (4.8 moles) of tert-butylglycidylether (BGE) and the reaction mixture was heated to 100° C. The reaction is strongly exothermic and by means of the controllable heat mantle was ensured that the temperature in the reaction mixture did not exceed 160° C. The reaction mixture was cooled to 80° C.
b) A hot solution of 621 g triacetoneamine (TAA) in 552 g toluene was added. The reaction mixture was heated under reflux for 20 minutes. Thereafter an azeotrope of toluene and water was distilled off, ca. 610 g. A brownish, yet clear product was obtained which was a viscous gel at 20° C. and a non-viscous liquid at 90° C.

The invention claimed is:

1. Polybranched, particulate, organic/ inorganic hybrid polymer, characterized in that the polymer is a sol-gel product with the following chemical basic structure:

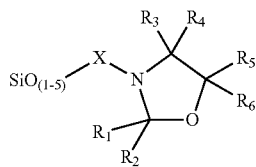

where $R_1$-$R_6$ are individually selected from the group consisting of hydrogen, non-substituted saturated or unsaturated $C_1$-$C_{24}$ alkyl, substituted saturated or unsaturated $C_1$-$C_{24}$ alkyl, substituted or non-substituted aryl, carbonyl, while carbon chains present in such groups optionally contain one or more of the elements oxygen, nitrogen, sulphur, phosphorous, silicon, and boron or where $R_1$-$R_6$ are chosen from condensation products or addition products of one or more type of chemical compounds selected from the group consisting of alcohols, phenols, amines, aldehydes and epoxides, and where X is a linkage group chosen among saturated or unsaturated $C_1$-$C_{18}$ alkylene, substituted or non- substituted arylene, while the carbon chains present in such groups are optionally be branched and/or contain one or more of the elements oxygen, nitrogen, sulphur, phosphorous, silicon, and boron.

2. Method for the manufacture of a polybranched, particulate, organic/inorganic hybrid polymer as defined in claim 1 by a sol-gel process, characterized in that the method comprises at least the following steps in chronological sequence:
i) an inorganic core is formed by controlled hydrolysis and condensation of a silane with the structure:

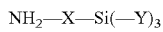

where X is a linkage group chosen from saturated or unsaturated $C_1$-$C_{18}$ alkylene, substituted or non-substituted arylene, while carbon chains present in such groups are optionally branched and/or contain one or more of the elements oxygen, nitrogen, sulphur, phosphorous, silicon, and boron and Y is a hydrolizable group,
ii) the organic branches are developed on the organic core by substitution of the N—H hydrogen atoms according to the following two reaction steps: a) substitution with epoxides represented by:

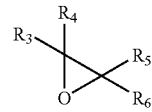

followed by b) a substitution with suitable carbonyl compounds represented by:

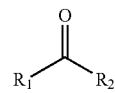

where $R_1$-$R_6$ are individually selected from the group consisting of hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, while carbon chains present in such groups optionally may contain one or more of the elements oxygen, nitrogen, sulphur, phosphorous, silicon, and boron or where $R_1$-$R_6$ are chosen from condensation products or addition products of one or more type of chemical compounds selected from the group consisting of acids, alcohols, phenols, amines, aldehydes or and epoxides, and where X is a linkage group chosen among saturated or unsaturated $C_1$-$C_{18}$ alkylene, substituted or non-substituted arylene, while carbon chains present in such groups are optionally branched and/or contain one or more of the elements oxygen, nitrogen, sulphur, phosphorous, silicon, and boron.

3. A method of producing a thermoplastic or thermosetting plastic composition which comprises incorporating therein a polybranched, particulate, organic/inorganic hybrid polymer as defined in claim 1 as a functional additive.

4. A method as claimed in claim 3 wherein said polybranched, particulate, organic/inorganic hybrid polymer is incorporated for use as an antioxidant, UV absorber or radical scavenger, or as a cross-linking agent.

5. A method of producing an adhesive, lacquer or coating composition which comprises incorporating therein a polybranched, particulate, organic/inorganic hybrid polymer as defined in claim 1.

* * * * *